United States Patent [19]
Solomon et al.

[11] Patent Number: 5,778,730
[45] Date of Patent: *Jul. 14, 1998

[54] ROBOTIC JOINT USING METALLIC BANDS

[75] Inventors: Todd R. Solomon, Los Gatos, Calif.; Alexander H. Slocum, Bow, N.H.

[73] Assignee: Smart Machines, San Jose, Calif.

[*] Notice: The term of this patent shall not extend beyond the expiration date of Pat. No. 5,682,795.

[21] Appl. No.: 677,493

[22] Filed: Jul. 9, 1996

Related U.S. Application Data

[63] Continuation-in-part of Ser. No. 500,429, Jul. 10, 1995, Pat. No. 5,682,795.

[51] Int. Cl.[6] .................................................. G05G 11/00
[52] U.S. Cl. ...................... 74/490.04; 474/270; 474/271; 403/387; 403/393; 901/21
[58] Field of Search .................... 74/490.04, 490.01, 74/89.22; 474/270, 271, 264, 268, 201, 202, 204; 403/393, 388, 387; 901/21, 23; 185/45

[56] References Cited

U.S. PATENT DOCUMENTS

| | | |
|---|---|---|
| 208,432 | 9/1878 | Spadone . |
| 219,531 | 9/1879 | Sharp . |
| 420,779 | 2/1890 | Emery . |
| 4,022,071 | 5/1977 | Abatemarco .................. 474/270 |
| 5,161,424 | 11/1992 | Saberton et al. ................. 74/409 |
| 5,271,292 | 12/1993 | Sawada et al. ............... 74/479 BF |
| 5,333,986 | 8/1994 | Mizukami et al. ............... 414/217 |

*Primary Examiner*—Charles A. Marmor
*Assistant Examiner*—David M. Fenstermacher
*Attorney, Agent, or Firm*—Fish & Richardson P.C.

[57] ABSTRACT

A robotic arm utilizing two pulleys connected by two metallic drive bands wound in opposite directions and rotatably attached to the pulleys. The metallic drive bands may include multiple metal strips separated by a visco-elastic material. One end of one drive band is attached to the pulley by a pin. A positioning mechanism is provided to adjust the tension of the band. The positioning mechanism includes a retaining piece, a wedge piece and an adjustment piece. The retaining piece is laterally movable and has an attachment point to the metal band and a slanted face. The wedge piece is vertically-movable and has a face abutting the slanted face of the retaining piece. The adjustment piece attaches the wedge piece to the pulley and moves the wedge piece vertically.

9 Claims, 4 Drawing Sheets

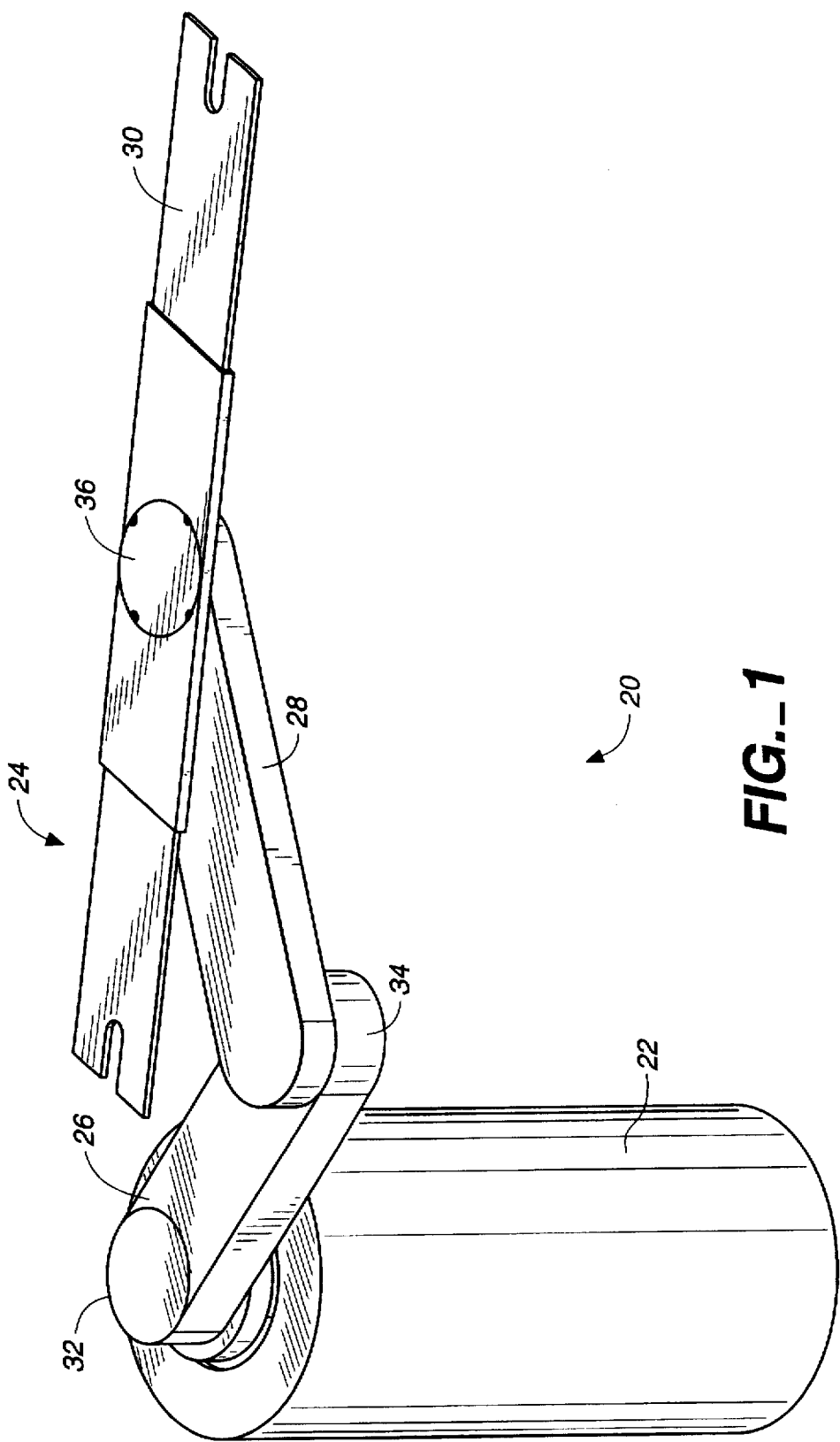

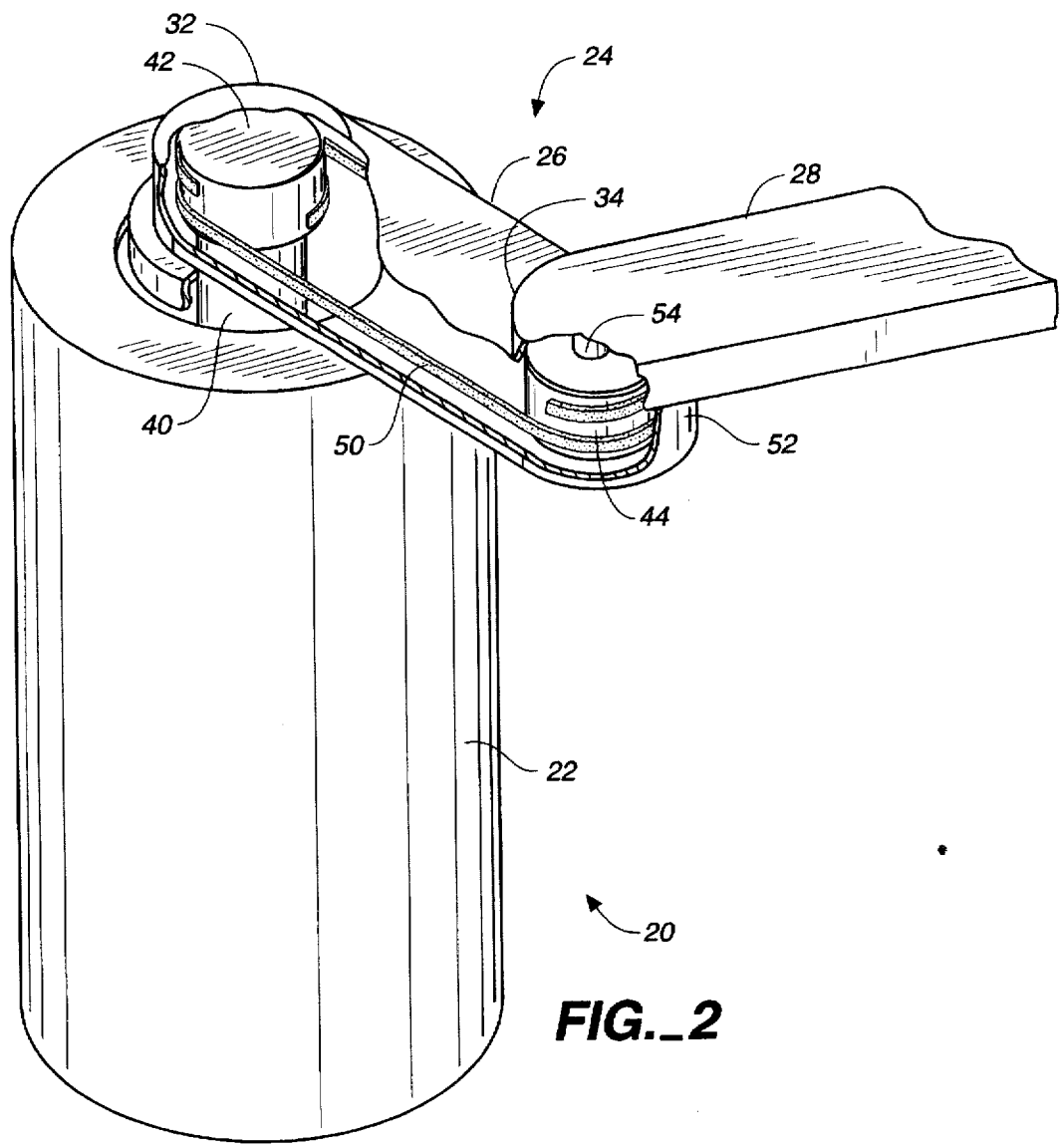
FIG._2

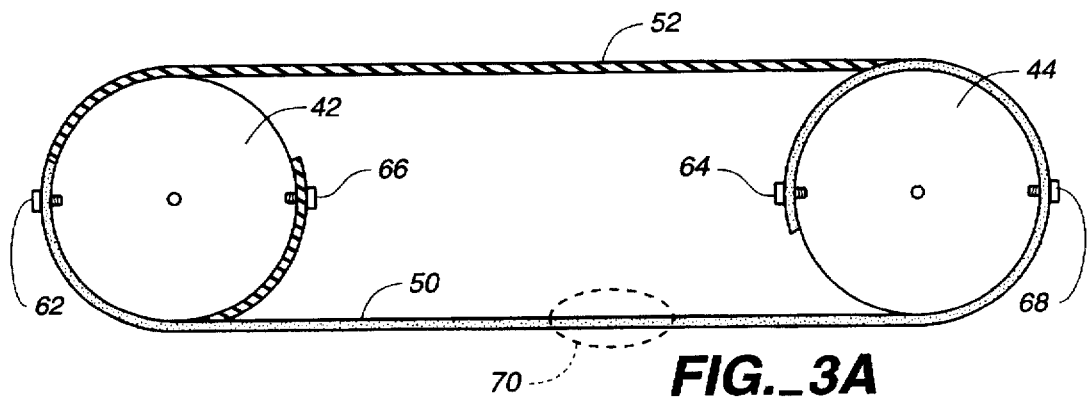
FIG._3A
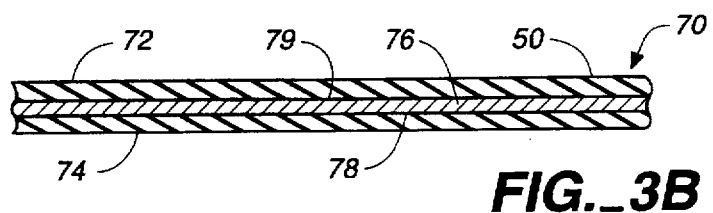
FIG._3B
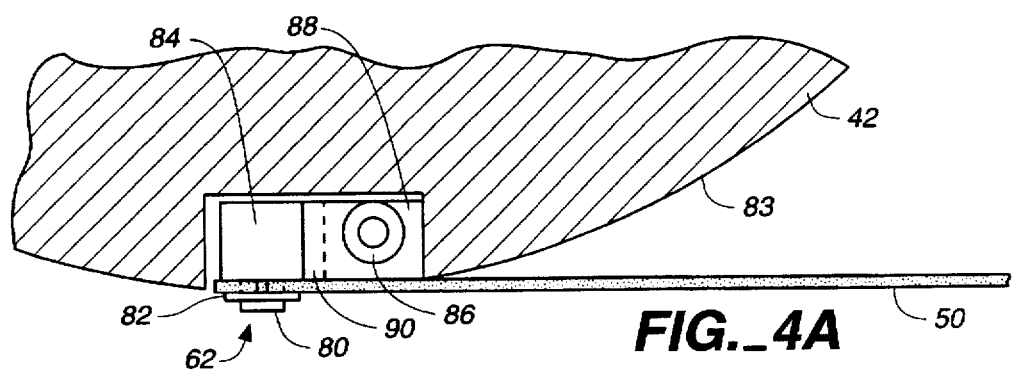
FIG._4A
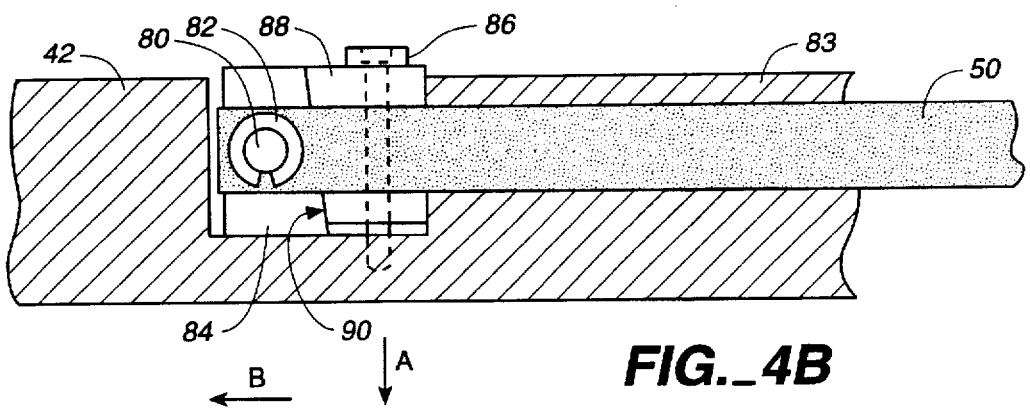
FIG._4B

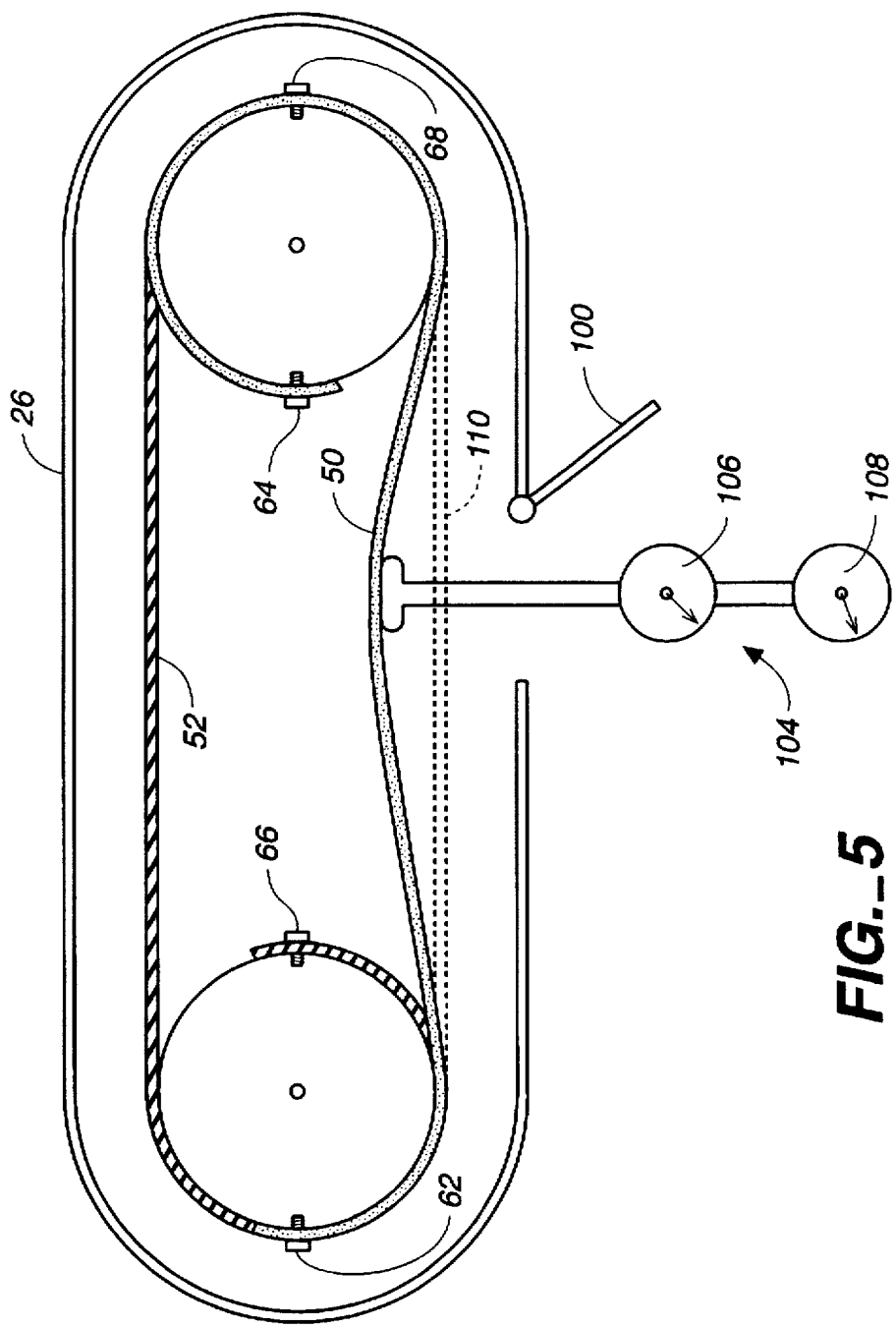
FIG._5

ROBOTIC JOINT USING METALLIC BANDS

CROSS REFERENCE TO RELATED APPLICATIONS

This application is a continuation-in-part of U.S. application Ser. No. 08/500,429, filed Jul. 10, 1996, now U.S. Pat. No. 5,682,795 and assigned to the assignee of the present application.

Reference is also made to U.S. application Ser. No. 08/500,124, filed Jul. 10, 1996, and U.S. application Ser. No. 08/500,428, filed Jul. 10, 1996, and to concurrently filed U.S. application Ser. No. 08/677,492, entitled ROTARY LABYRINTH SEAL, and concurrently filed U.S. application Ser. No. 08/677/402, entitled DIRECT DRIVEN ROBOT, all assigned to the assignee of the present application, and each of which is hereby incorporated by reference.

BACKGROUND OF THE INVENTION

The present invention relates generally to a robot using metallic drive bands to drive a robotic arm, and more particularly to a robot in which a pulley at the "shoulder" of the robot arm is connected to a pulley at the "elbow" of the robot arm with metallic drive bands.

Material handling robots are used in automated manufacturing of integrated circuits, flat panel displays, and other precision-made products. Many of these products require near-sterile handling of extremely fragile and expensive materials, such as semiconductor wafers, during the manufacturing process. In semiconductor manufacturing, raw materials and in-process workpieces must be kept extremely clean; the circuit paths etched on the workpieces are so small (e.g., 0.18–10 microns) that minute particles can contaminate the paths and render the finished circuit inoperative. Therefore, sealed, ultra-clean robots are used to move the materials accurately, gently, and precisely, within a clean room, preventing contamination or damage to the materials which could occur through human contact or handling. However, such robots must not generate particles of metal, leak chemicals, or produce other materials which could contaminate a wafer or other workpiece.

Furthermore, robots must move precisely to specific points in space to carry out various manufacturing steps. Because wafers, flat panels and other workpieces are extremely fragile and expensive, all robot movements must be gentle and precise. "Backlash," or play in the mechanical components of the robot, must be minimized to ensure accurate movement and to prevent damage to an object on the robot.

In addition, some manufacturing processes are carried out in a vacuum, or require hazardous chemicals. Robots must be vacuum-compatible, and able to handle materials in vacuum and corrosive environments which are hostile to humans.

A typical robotic arm is constructed to mimic a human arm, and has three joints: shoulder, elbow and wrist. The robotic arm usually includes three motors to control the rotation of the three joints. If the motors are not located in the joints themselves, then there must be drive systems to connect the motors to the joints. For example, a motor may be located in a base of a robot to control the rotation of the elbow joint. Often the drive system includes one pulley attached to a drive shaft from the motor, another pulley at the joint, and a drive belt connecting the two pulleys.

Typically, the pulleys are connected by a continuous elastic drive belt which wraps around both pulleys. The pulleys may also be connected by a continuous timing belt with teeth that engage mating teeth on the pulleys. The elastic drive belt may be made of a stiff polymer or rubber material. Unfortunately, such drive belts have a short lifetime and are subject to fatigue. In addition, gasses trapped in the rubber drive belt may escape due to outgassing and contaminate the environment.

In addition, the elastic material can stretch, causing uncertainty in the position of the driven pulley. Stretching also reduces the tension in the drive belt. If the tension in the drive belt is low, the drive belt may slip, causing the robotic arm to stutter and jerk. Although a timing belt does not slip, the accuracy of the timing suffers due to the stretching. In addition, timing belts are subject to backlash from the clearance between teeth on the pulley and drive belt.

If the driving pulley comes to a sudden stop, the driven pulley may continue to rotate, stretching the elastic drive band. Then the driven pulley may rotate backwards to relax, or even compress, the drive band.

These effects are unacceptable because they require the arm to move more slowly. If the robotic arm is carrying substrates in a deposition chamber, for example, then the throughput of the chamber is reduced. In addition, these effects increase the likelihood of accidental damage to the manipulated article. For example, rather than sliding under a silicon substrate to lift it out of the deposition chamber, the arm might smash into the substrate.

Maintaining the proper tension in a drive belt can be difficult. In general, for a circular drive belt, the only way to increase the tension is to move the pulleys farther apart, add an adjustable idler pulley or replace the drive belt. A drive system in which the pulleys need not be moved would be less expensive.

SUMMARY OF THE INVENTION

In general, in one aspect, the invention is directed to a robotic arm. The robotic arm comprises a first pulley located at a first joint of the robotic arm, and a second pulley located at a second joint of the robotic arm. A metallic drive band is attached to the first pulley and the second pulley. The metallic drive band includes a plurality of stacked metal strips.

Implementations include the following. The metal strips may be separated by a visco-elastic material.

In general, in another aspect, the invention is directed to a robotic arm. The robotic arm includes a pulley located at a joint of a robotic arm, a metallic band, and a positioning mechanism which attaches the band to the pulley. The positioning mechanism includes a laterally movable retaining piece, a vertically movable wedge piece, and an adjustment piece. The retaining piece has an attachment point connected to one end of the metal band, and a slanted face which abuts a face of the wedge piece. The adjustment piece attaches the wedge piece to the pulley and moves the wedge piece vertically.

Implementations include the following. The metal band may have an aperture, and the retaining piece may have a projection which fits through the aperture. There may be a retaining clip to hold the metal band on the projection. The adjustment piece may be a screw.

In general, in another aspect, the invention is directed to a robotic arm. The robotic arm comprises a first pulley located at a first joint of the robotic arm and, a second pulley located at a second joint of the robotic arm. Two opposing metallic drive bands each have one end rotatably attached to the first pulley and the other end rotatably attached to the second pulley.

The advantages of the invention include the following. The invention provides a robotic arm having a drive band which has a relatively long lifetime and less likely to fatigue. The robotic arm includes a drive system with excellent timing and minimal backlash. In addition, the arm includes a mechanism to adjust the tension of the drive band without changing the position of the pulleys.

Additional objects and advantages of the invention will be set forth in the description which follows, and in part will be obvious from the description, or may be learned by practice of the invention. The objects and advantages of the invention may be realized by means of the instrumentalities and combinations particularly pointed out in the claims.

BRIEF DESCRIPTION OF THE DRAWINGS

The accompanying drawings, which are incorporated in and constitute a part of the specification, schematically illustrate the invention, and together with the general description given above and the detailed description given below, serve to explain the principles of the invention.

FIG. 1 is a schematic perspective view of a robot.

FIG. 2 is a schematic perspective view of a robotic arm with a portion of the cover of the upper arm cut-away for clarity.

FIG. 3A is a schematic top-view of two pulleys connected by two drive bands.

FIG. 3B is an enlarged view of a portion of one of the drive bands of FIG. 3A.

FIG. 4A is a schematic top view of the connection of a drive band to a pulley.

FIG. 4B is a schematic side view of the connection of a drive band to a pulley.

FIG. 5 is a schematic top-view illustrating a method of measuring the tension in a drive band.

DESCRIPTION OF THE PREFERRED EMBODIMENT(S)

As shown in FIG. 1, a robot 20 is constructed to mimic the lateral freedom of motion of a human arm. Robot 20 has a base 22 and a movable arm 24. The movable arm 24 includes an upper arm 26, a forearm 28 and a hand 30. Upper arm 26 is connected to base 22 at a rotatable shoulder 32; forearm 28 is connected to upper arm 26 by a rotatable elbow 34; and hand 30 is connected to forearm 28 by a wrist 36.

Referring to FIG. 2, base 22 contains motors (not shown) to drive several rotatable shafts. A first rotatable shaft (not shown) controls the rotation of shoulder 32, and a second rotatable shaft 40 controls the rotation of elbow 34. The first rotatable shaft is connected directly to upper arm 26. The second rotatable shaft 40 is connected to a shoulder pulley 42 in shoulder 32. The shoulder pulley 42 is connected to an elbow pulley 44 in elbow 34 by a drive band 50 which passes through upper arm 26. The elbow pulley 44 is connected to elbow 34 by a third shaft 54. The first shaft may be disposed concentrically around the second shaft. The pulleys may be the same size (see FIG. 3A) or the pulleys may be different sizes (see FIG. 2). Drive band 50 does not form a continuous circular belt around the pulleys. Instead, one end of drive band 50 is attached to the rim of shoulder pulley 42 and the other end of band 50 is attached to the rim of elbow pulley 44. A second drive band 52 may be attached at its ends to shoulder pulley 42 and elbow pulley 44.

As shown in FIG. 3A, drive band 50 is pinned to pulleys 42 and 44 by pins 62 and 64, respectively. One end of drive band 50 is wrapped in a counter-clockwise manner around pulley 42 and in a clockwise fashion around pulley 44. Second drive band 52 is wrapped around pulleys 42 and 44 in an opposite manner to that of drive band 50. Drive band 52 is pinned to the pulleys 42 and 44 by pins 66 and 68, respectively. This configuration places both drive bands in constant tension so that neither drive band ever goes slack. However, neither pulley can rotate the full 360°. If the pulleys rotated a full 360°, then the drive band would overwrap pin 62 or 64 and be damaged. In practice, pulleys 42 and 44 cannot rotate more than 320°–330°. In an application, such as a robotic arm which does not need a full range of motion, this attachment configuration is preferred because it has no slippage, and thus excellent timing. The timing is guaranteed to be accurate because the ends of drive bands 50 and 52 are pinned in place to prevent slippage.

Drive bands 50 and 52 could be replaced by a single belt attached at two points to the pulleys 62 and 64. However, this would further limit the freedom of rotation of the robotic arm.

In one embodiment, each drive band is a metallic strip, three-thousandths to ten-thousandths of an inch thick and one-eighth of an inch to a few inches wide. A stainless steel strip is vacuum compatible. A metallic band is less likely to stretch or fatigue. As such, it has a relatively long lifetime and provides superior reliability. Each drive band may be formed of stainless steel and may be permanently pretensioned.

In another embodiment, shown in FIG. 3B, each drive band 70 includes two metallic strips 72 and 74 separated by an visco-elastic material 76. By using two metallic strips, the stiffness of the drive band is effectively doubled. However, if the two metallic strips are directly adjacent, they will slide against each other and abrade each time the drive band moves. The visco-elastic material 76, such as a soft elastic rubber, is placed between metallic strips 72 and 74 to act as a buffer. The visco-elastic material 76 allows strips 72 and 74 to move relative to each other a small amount without a lot of friction or abrasion. In addition, visco-elastic material 76 may dampen out any vibration in the drive band. If multiple metallic strips are used, then preferably pulleys 42 and 44 are the same diameter.

Visco-elastic material 76 may be about half a mil to several mils thick. In one embodiment, visco-elastic material 76 is bonded to metal strips 72 and 74 by thin adhesive layers 78 and 79. Adhesive layers 78 and 79 may be an elastomeric material. In another embodiment, visco-elastic material 76 is held between metal strips 72 and 74 simply by the tension in the drive band.

As shown in FIGS. 4A and 4B, the end of drive band 50 is rotatably attached to a rim 83 of pulley 42 by pin 62. In particular, the end of drive band 50 has a hole through which a spoke 80 of pin 62 projects. A retaining spring clip 82, in the form of a slotted washer, is attached to the spoke to secure drive band 50 thereto. Spoke 80 projects from a base 84 to provide the attachment point for band 50. Alternately, spoke 80 could project directly from rim 83 of pulley 42. The hole in drive band 50 is slightly larger than spoke 80. Thus retaining clip 82 does not hold drive band 50 tightly, and drive band 50 is free to pivot around spoke 80. This attachment equalizes the stresses across the drive band 50 and thereby increases the lifetime of the drive band. If drive band 50 were fixedly attached to pin 62 so it could not move relative to spoke 80, then drive band 50 would fatigue quickly. If pulley 42 rotates slightly relative to drive band 50 (i.e., about the axis of spoke 80) then the distance to pulley 44 would be different along the two edges of drive band 50. Thus, one edge of the drive band would be in tension and the other edge would be slack. Consequently, only part of drive band 50 would carry the load, and the drive band would stretch.

Pulley 42 has a positioning mechanism to adjust the position of pin 62 and thereby adjust the tension on drive band 50. Specifically, a screw 86 passes into a threshold opening in pulley 42 and holds a tightening wedge 88 adjacent the pulley. One face of tightening wedge 88 engages a diagonal face 90 of base 84. To increase the tension in band 50, screw 86 is tightened, pushing tightening wedge 88 down in the direction of arrow A. This pushes wedge 88 against diagonal surface 90, thereby forcing base 84 to slide in the direction of arrow B. Conversely, to decrease the tension in drive band 50, screw 86 is loosened. The range of lateral adjustment of base 84 is about one-tenth of an inch. Base 84 and wedge 88 are positioned so that drive band 50 may be kept at a tension up to several hundred pounds.

As noted, drive band 50 is rotatably attached at the other end to pulley 44 by pin 64. However, the connection of drive band 50 to pulley 44 need not include the positioning mechanism 78. Only one end of the drive band needs to moved to adjust the drive band tension. Drive belt or band 52 may be attached to pulleys 42 and 44 in the same manner as drive belt or band 50, with both ends of drive belt rotatably attached to pulleys 42 and 44 by pins 66 and 68, and one end of drive belt 52 connected to a pulley by a positioning mechanism.

As shown in FIG. 5, to measure the tension of band 50, an access port 100 in arm 26 (sometimes called a "tub") is provided. An instrument 104 is inserted into access port 100 to engage drive band 50 to measure the drive band tension. Instrument 104 may include a force gage 106 to measure the force applied to drive band 50, and a deflection gage 108 to measure the deflection of the drive band from its undeflected path 110. Then tension of drive band 50 is calculated from the measurements of the applied force and deflection.

The present invention has been described in terms of a preferred embodiment. The invention, however, is not limited to the embodiment depicted and described. Rather, the scope of the invention is defined by the appended claims.

What is claimed is:

1. A robotic arm, comprising:
  a pulley located at a joint of said robotic arm;
  a metallic band; and
  a positioning mechanism attaching said metal band to said pulley, said positioning mechanism including
    i) a retaining piece movable along a first axis, said retaining piece having an attachment point connected to one end of said metallic band, said retaining piece having a slanted face,
    ii) a wedge piece movable along a second axis substantially perpendicular to the first axis, said wedge piece having a face abutting said slanted face, and
    iii) an adjustment piece to attach said wedge piece to said pulley and to move said wedge along said second axis.

2. The robotic arm of claim 1 wherein said metal band includes an aperture at one end thereof, and said attachment point includes a projection which fits through said aperture.

3. The robotic arm of claim 2 wherein said adjustment piece is a screw.

4. The robotic arm of claim 2 further comprising a retaining clip to hold said metal band on said projection.

5. A robotic arm comprising:
  a first pulley located at a first joint of said robotic arm and having a first cylindrical surface;
  a second pulley located at a second joint of said robotic arm and having a second cylindrical surface;
  a first drive band having one end pivotally attached to said first pulley at a first attachment point and free to pivot about a first axis normal to the first cylindrical surface, said first axis passing through said first attachment point, said first drive band having another end rotatably attached to said second pulley at a second attachment point and free to pivot about a second axis normal to the second cylindrical surface, said second axis passing through said second attachment point; and
  a second drive band having one end pivotally attached to said first pulley at a third attachment point and free to pivot about a third axis normal to the first cylindrical surface, said third axis passing through said third attachment point, said second drive band having another end rotatable attached to said second pulley at a fourth attachment point and free to pivot about a fourth axis normal to the second cylindrical surface, said fourth axis passing through said fourth attachment point.

6. The robotic arm of claim 5 wherein said first and second drive bands each include two apertures, and each of said pulleys includes projections to fit through said apertures.

7. The robotic arm of claim 6 further including a plurality of retaining clips to hold said drive bands on said projections.

8. The robotic arm of claim 5 wherein said first and second drive bands each include a laminar stack of a plurality of parallel metallic strips.

9. The robotic arm of claim 8 wherein said laminar stack includes a layer of visco-elastic material which separates said parallel metallic strips.

* * * * *